United States Patent [19]
Kojima et al.

[11] Patent Number: 4,966,820
[45] Date of Patent: Oct. 30, 1990

[54] CERAMICS-COATED HEAT RESISTING ALLOY MEMBER

[75] Inventors: Yoshitaka Kojima; Akira Mebata, both of Ibaraki; Akihiko Chiba, Iwate; Ryoichiro Ohoshima, Ibaraki; Norio Watanabe, Tokyo; Yukiyoshi Hara, Saitama, all of Japan

[73] Assignees: Hitachi, Ltd.; The Tokyo Electric Power Company, both of Tokyo, Japan

[21] Appl. No.: 346,649

[22] Filed: May 3, 1989

[30] Foreign Application Priority Data

May 6, 1988 [JP] Japan ................. 63-109025

[51] Int. Cl.$^5$ ........................... B32B 15/04
[52] U.S. Cl. ........................ 428/622; 428/629; 428/633; 428/678; 428/701
[58] Field of Search ............ 428/622, 623, 628, 629, 428/632, 633, 678, 697, 701, 702

[56] References Cited
U.S. PATENT DOCUMENTS 4,503,130  3/1985  Bosshart et al. ............. 428/633

*Primary Examiner*—Theodore Morris, III
*Assistant Examiner*—George Wyszomierski
*Attorney, Agent, or Firm*—Antonelli, Terry, Stout & Kraus

[57] ABSTRACT

A ceramic-coated heat resisting alloy member comprises a base metal mainly composed of at least one of nickel, cobalt and iron; a mixture layer which is deposited on the external surface of the base metal and which comprises a ceramics and a metal; an alloy layer which is formed between the mixture layer and a ceramic coating layer formed as an outermost layer and which comprises an alloy material exhibiting excellent resistance to high temperature oxidation and excellent resistance to high temperature corrosion. It is therefore possible to prevent any high temperature oxidation and high temperature corrosion of the mixture layer and to enable the mixture layer to have a satisfactory function of reducing the thermal stress produced between the ceramic coating layer and the base metal. The ceramic coating thus has a satisfactory thermal barrier effect on the base metal. In addition, it is therefore possible to provide the ceramic-coated heat resisting alloy member as a useful structural member for improving the power efficiency of gas turbine plants used for power generation.

13 Claims, 1 Drawing Sheet

CERAMICS-COATED HEAT RESISTING ALLOY MEMBER

BACKGROUND OF THE INVENTION

1. Field of the Invention

The present invention relates to a heat resistant alloy member which is used at high temperatures or in corrosive environments at high temperatures.

2. Description of the Prior Art

Techniques for improving the heat resisting property of structural members of gas turbines operated by high temperature gas have been investigated with a view for improving the thermal efficiency of gas turbine power stations. The establishment of the above-mentioned techniques is necessary for coal gasification power stations having higher cost of fuel in order to enhance its economically competitive ability against the other kind of power stations. There is therefore a demand for improved heat resisting alloy members in order to cope with the intention to increase the gas temperatures for gas turbine power stations. A principal method of providing members with heat resistance at higher temperatures is to develop new materials for forming such members. Among various types of metal materials, Ni or Co-based alloys have heat resistant temperatures of about 850° C. On the other hand, ceramics have a sufficient heat resisting property for high temperatures but involve certain problems with respect to their toughness and so on, particularly when they are used in moving blades which serves as high-speed rotors. Thus another method of achieving the technique for improving a heat resisting property is to prevent any increase taking place in the temperature of the relevant members. An example of this method is the combination of cooling members and coating members with ceramics having a low degree of thermal conductivity. Such a coating is called a thermal barrier coating (referred to as "TBC" hereinafter). TBC comprises a base metal composed of a heat resisting alloy and a coating of ceramics having physical properties which are different in numerical value from those of the base metal. An important technical problem of TBC is thus to reduce the thermal strain and thermal stress produced owing to the difference in the numerical values of the physical properties between the base metal and the ceramic coating. In particular, damage such as separation or the like may occur in the ceramic coating layer owing to the thermal stress based on a cyclic heating from starting to stopping of a gas turbine. A known method of reducing thermal stress is the method in which an intermediary layer is provided which serves to reduce the difference in thermal expansion coefficient between the ceramic coating layer and the base metal composed of a heat resisting alloy. Such an intermediary layer is disclosed in, for example, Japanese Patent Laid-Open No. 211362/1987. The intermediary layer is generally a mixture layer comprising ceramics and a metal. Although the thermal expansion coefficient of such a mixture layer depends upon the mixing ratio used, it is generally considered that the mixture layer should have a thermal expansion coefficient of a value midway between those of the ceramics and the metal. When this sort of mixture layer is interposed between a ceramic layer and a base metal, a function of reducing thermal stress can, as a matter of course, be expected.

On the other hand, since the ceramic coating layer used in TBC is mainly formed by spray coating, it is a porous substance. This porous ceramic coating layer is capable of reducing thermal stress by itself by virtue of its porous structure. However, since the ceramic coating layer may be used in corrosive environments at high temperatures, high temperature oxidation or high temperature corrosion takes place in the mixture layer provided below the ceramic coating layer through the ceramic coating layer which consists of a porous substance. The inventors have thus conducted oxidation tests on mixture coating layers comprising ceramics and metals. Each of the test pieces employed was made by forming a mixture coating layer on a surface of a base metal and then removing the base metal to form a sample comprising a mixture. Each of the thus-formed test pieces was then subjected to an oxidation test under heating at 1000° C. for 1000 hours in the atmosphere. As a result, internal oxidation proceeded to a significant extent in each of the test pieces comprising mixtures in the oxidation tests. It is thought that such internal oxidation proceeds through cavities present at grain boundaries in the coating layers which comprises the mixture of ceramic powder and metal powder and which is simply formed by laminating the two types of powder by spray coating. Such internal oxidation in a mixture layer proceeded to a significant extent in a ceramic-coated test piece comprising a ceramic coating layer, a mixture layer and a base metal. The ceramic layer in this ceramic-coated test piece became separated after a high-temperature oxidation test at 1000° C. for 1000 hours. Thus the mixture layer provided for the purpose of reducing thermal stress cannot achieve the intended purpose. It is thought that the separation of the ceramic layer is caused by the thermal stress newly produced in the mixture layer owing to the internal oxidation in the mixture layer itself and by a reduction in the adhesion between the ceramic coating layer and the mixture layer owing to the oxidation at the boundary therebetween. Such a problem causes a reduction in the reliability of TBC. On the other hand, a thermal barrier effect required for TBC is increasingly improved as the working temperature of a gas turbine is raised. In other words, it is necessary to increase the thickness of the ceramic coating layer for the purpose of improving the thermal barrier effect. In this case, the thermal stress produced by a repeated heat load or the like is of course increased. It is therefore necessary to improve the durability of the ceramic coating by reducing the thermal stress produced in the ceramic coating layer owing to a repeated heat load or the like.

As described above, although TBC provided with a mixture layer is provided for the purpose of reducing the thermal stress produced between a ceramic coating layer and a base metal, the mixture layer does not always possess a sufficient function of reducing thermal stress under high temperature conditions because the resistance to oxidation of the mixture layer at high temperatures is inadequate. In addition, the mixture layer does not always possess sufficient corrosive resistance at high temperatures.

SUMMARY OF THE INVENTION

Accordingly, it is an object of the present invention to provide a ceramic-coated heat resisting alloy member which enables a mixture layer comprising ceramics and a metal to exhibit its function of reducing thermal stress to an adequate extent even under corrosive conditions at high temperatures, this function of the mixture layer being the primary purpose of the provision thereof.

The present invention provides a ceramic-coated heat resisting alloy member comprising a heat resisting alloy base metal, a mixture layer which comprises ceramics and a metal and which is deposited on the external surface of the base metal, and a ceramic coating layer which is deposited on the mixture layer, the alloy member being characterized in that an alloy layer comprising an alloy material which is superior to the base metal with respect to its resistance to high temperature oxidation and resistance to high temperature corrosion is provided on the outside of the mixture layer.

The alloy layer has the function of protecting the mixture layer from oxidation and corrosion which proceed at high temperatures through the porous ceramic coating layer. That is, since the mixture layer comprises a mixture of ceramic grains and metal grains and has a thermal expansion coefficient of a value midway between those of the ceramics and the metal, it has the function of reducing the thermal strain produced between the ceramic coating layer and the heat resisting alloy base metal and the thermal stress produced owing to this strain. Since the mixture layer does not possess a sufficient degree of resistance to high temperature oxidation and or high temperature corrosion because cavities are present at the grain boundaries, however, the outside portion of the mixture layer is protected by the alloy layer provided between the mixture layer and the ceramic coating layer, whereby high temperature oxidation and high temperature corrosion are prevented. The mixture layer consequently remains stable even under conditions of high temperature oxidation and high temperature corrosion and is thus able to satisfactorily exhibit its primary function of reducing the thermal stress between the ceramic coating layer and the heat resisting alloy base metal.

Examples of ceramics used in the present invention include ceramics containing $ZrO_2$ as a main component and $Y_2O_3$, MgO or CaO which is added thereto. The composition of the ceramics is at least one of $ZrO_2$ and 4 to 20 wt % of $Y_2O_3$, $ZrO_2$ and 4 to 8 wt % of CaO and $ZrO_2$ and 4 to 24 wt % of MgO. Spray coating powders of $ZrO_2$-based ceramics having such a composition are produced by grinding and sizing $ZrO_2$-based ceramics containing $Y_2O_3$, CaO or MgO which is formed by an electric melting method or a calcination method, each powder containing the above-described additive.

Each of materials used for forming alloy layers contains at least one of Ni and Co as a main component, 13 to 40 wt % of Cr, 5 to 20 wt % of Al and a total content of 0.1 to 3 wt % of at least one of Hf, Ta, Y, Si and Zr. Alloys having such a composition has excellent resistance to high temperature oxidation and resistance to high temperature corrosion.

In addition, heat resisting alloy base metals are super alloys having a composition comprising Ni as a main component, 7 to 20 wt % of Cr, 1 to 8 wt % of at least one of Ti and Al and Ta, Nb, W, Mo or Co, e.g., IN-738 (produced by Inconel Corp.) comprising Ni, 16% Cr, 8.5% Co, 3.4% Al, 3.4% Ti, 2.6% W, 1.7% Mo, 1.7% Ta, 0.9% Nb and 0.1% Zr, or a composition comprising Co as a main component, 25 to 35 wt % of Cr and Ni and W, e.g., FSX-414 (produced by GE Corp.) comprising Co, 30% Cr, 10% Ni, 2.0% Fe and 7.0% W.

The ceramic-coated heat resisting alloy member in accordance with the present invention exhibits an improved level of durability as compared with conventional alloy members, and the durability does not deteriorate even if the thickness of the ceramic coating layer is increased. The heat resisting alloy member therefore makes a significant contribution to the inhibition of any increase in the temperature of the heat resisting alloy base metal.

When the alloy layer is interposed between the ceramic coating layer and the mixture layer, as well as an oxide layer mainly composed of Al being formed at the boundary between the alloy layer and the ceramic coating layer, the same effect as that described above can be obtained, and the adhesion between the ceramic coating layer and the alloy layer is improved. Thus the level of durability can be maintained even if the thickness of the ceramic coating layer is increased for the purpose of improving the thermal barrier effect.

The object, advantages and novel characteristics of the present invention are described in detail below with reference to the attached drawings.

DETAILED DESCRIPTION OF THE PREFERRED EMBODIMENTS

The present invention is described in detail below with reference to embodiments.

Figure 1:
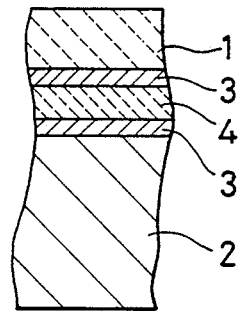
FIG. 1 is a schematic sectional view of an embodiment of the ceramic-coated heat resisting alloy member in accordance with the present invention.
Figure 5:
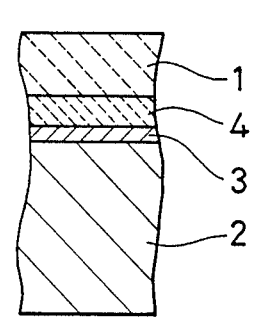
FIGS. 5 and 6 are respectively schematic sectional views of conventional ceramic-coated heat resisting alloy members.
Figure 6:
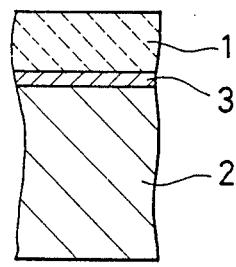

FIG. 1 is a schematic sectional drawing of a ceramic-coated heat resisting alloy member in an embodiment of the present invention. FIGS. 5 and 6 are respectively schematic sectional views of conventional ceramic-coated heat resisting alloy members. In each of FIGS. 1, 5 and 6, reference numeral 1 denotes a ceramic coating layer; reference numeral 2, a heat resisting alloy base metal; reference numeral 3, an alloy layer comprising an alloy exhibiting resistance to high temperature oxidation and resistance to high temperature corrosion which are superior to the resistance of the base metal; and reference numeral 4, a mixture layer comprising the above-described alloy and ceramics. The material comprising the ceramic coating layer 1 is a $ZrO_2$-type ceramics which is composed of $ZrO_2$ as a main component and $Y_2O_3$, MgO, CaO and so on as additional components. The material comprising the alloy layer 3 is composed of at least one of Co and Ni, Cr and Al and at least one of Hf, Ta, Y, Si and Zr. The mixture layer 4 comprises a mixture containing $ZrO_2$-type ceramics and the alloy material. In the embodiment of the present invention shown in FIG. 1, the two alloy layers 3 may comprise the same alloy or alloys composed of different components. The method of forming each of the layers is not particularly limited, but a plasma spray coating method is preferable from the viewpoint of the high material deposition velocities and the good workability. An electron beam vacuum evaporation method or a sputtering method may be used as a method of forming a coating layer such as an alloy layer or the like with a relatively small thickness.

EXAMPLE 1

An Ni-based alloy IN-738 was used as a base metal, and a surface thereof was then degreased and then subjected to blasting using an alumina grit. An alloy layer was then formed on the base metal by plasma spray coating using an alloy material comprising 32% by weight of Ni, 21% by weight of Cr, 8% by weight of Al, 0.5% by weight of Y and the balance composed of Co. The plasma spray coating was performed at pressure of 200 Torr in an atmosphere of Ar. The power of plasma was 40 kW. The alloy layer formed under these conditions had a thickness of 0.1 mm. A mixture comprising a ceramic powder containing $ZrO_2$ and 8% by weight of $Y_2O_3$ and alloy powder having the above-described composition was then spray-coated on the alloy layer formed. The mixing ratio between the metal and ceramic power was 2:1. The conditions of spray coating were the same as those employed in the formation of the alloy layer. In this way, a mixture layer comprising the mixture of ceramics and a metal was formed on the alloy layer. The thickness of the mixture layer was 0.02 to 0.6 mm. An alloy powder having the above-described composition was then spray-coated on the mixture layer under the same conditions as those employed in the formation of the alloy layer to form an alloy layer having a thickness of 0.02 to 0.6 mm. A powder comprising $ZrO_2$ and 8% by weight of $Y_2O_3$ was further spray-coated on the alloy layer formed. The spray coating was performed with a plasma power of 50 kW in the atmosphere. The thickness of the coating layer comprising $ZrO_2$ and 8% by weight of $Y_2O_3$ was 0.3 to 1.2 mm. Heating treatment was then effected at 1120° C. for 2 hours under vacuum so that the base metal and the alloy layer in contact with the base metal were subjected to diffusion treatment.

Conventional TBC test pieces comprising a base metal, an alloy layer and a ceramic coating layer and comprising a base metal, an alloy layer, a mixture layer and a ceramic coating layer were also produced for the purpose of comparison. The production conditions and coating material used were the same as those of the TBC test pieces of the present invention. Each of the test pieces had a size of 20 mm×70 mm×3 mm.

Table 1 shows the results of repeated load tests conducted for the ceramic-coated test pieces of the present invention and conventional ceramic-coated test pieces which were formed for the purpose of comparison. In Table 1, Sample Nos. 1 and 8 concern the conventional ceramic-coated test pieces and Sample Nos. 9 to 23 concern the ceramic-coated test pieces of the present invention. Each of the repeated heat load tests was performed by repeatedly heating and cooling between 170° C. and 1000° C., and evaluation was conducted by examining the presence of damage in each of the ceramic-coated test pieces. The thickness of the ceramic coating layers in each of the ceramic-coated test pieces of the present invention is preferably 1.0 mm or less.

TABLE 1

| Sample No. | Results of Repeated Heat Load Tests Thickness of (mm) | | | | N* |
|---|---|---|---|---|---|
| | Ceramic layer | Alloy layer I | Mixture layer | Alloy layer II | |
| 1 | 0.3 | — | — | 0.1 | 500 |
| 2 | 0.4 | — | — | 0.1 | 250 |
| 3 | 0.6 | — | — | 0.1 | 70 |
| 4 | 0.4 | — | — | 0.05 | 230 |
| 5 | 0.4 | — | 0.2 | 0.1 | 90 |
| 6 | 0.6 | — | 0.2 | 0.1 | 45 |
| 7 | 0.8 | — | 0.2 | 0.1 | 25 |
| 8 | 0.4 | — | 0.4 | 0.1 | 120 |
| 9 | 0.4 | 0.1 | 0.2 | 0.1 | 1250 |
| 10 | 0.6 | 0.1 | 0.2 | 0.1 | 900 |
| 11 | 0.8 | 0.1 | 0.2 | 0.1 | 750 |
| 12 | 1.0 | 0.1 | 0.2 | 0.1 | 600 |
| 13 | 1.2 | 0.1 | 0.2 | 0.1 | 95 |
| 14 | 0.4 | 0.02 | 0.2 | 0.1 | 250 |
| 15 | 0.4 | 0.03 | 0.2 | 0.1 | 900 |
| 16 | 0.4 | 0.3 | 0.2 | 0.1 | 1200 |
| 17 | 0.4 | 0.5 | 0.2 | 0.1 | 800 |
| 18 | 0.4 | 0.6 | 0.2 | 0.1 | 160 |
| 19 | 0.4 | 0.1 | 0.02 | 0.1 | 270 |
| 20 | 0.4 | 0.1 | 0.03 | 0.1 | 950 |
| 21 | 0.4 | 0.1 | 0.3 | 0.1 | 1100 |
| 22 | 0.4 | 0.1 | 0.5 | 0.1 | 850 |
| 23 | 0.4 | 0.1 | 0.6 | 0.1 | 200 |

N*: Number of times of repeated heat load until damage occurs in ceramic coating There is a tendency that the durability of a test piece to the repeated heat load test deteriorates if the thickness of the ceramic coating layer is more than 1 mm, as in Sample No. 13 shown in Table 1. The thickness of the alloy layer (the alloy layer 1 shown in Table 1) between the ceramic coating layer 1 and the mixture layer 4 is preferably within the range of 0.03 to 0.5 mm. There is also a tendency that the durability to the repeated heat load test deteriorates if the thickness of the alloy layer I is out of the above-described range, as in Sample Nos. 14 and 18 shown in Table 1. If the thickness of the alloy layer I is small, the alloy layer is unsatisfactory as a layer for preventing any oxidation or corrosion through the ceramic coating layer. On the other hand, if the thickness of the alloy layer I is large, the alloy layer itself functions as a layer which newly produces thermal stress and thus cancels the thermal stress reducing function of the mixture layer 4. The thickness of the mixture layer 4 is preferably within the range of 0.03 to 0.5 mm. When the thickness of the mixture layer is out of the above-described range, as in Example Nos. 19 and 23 shown in Table 1, the durability to the repeated heat load test deteriorates. When the thickness of the mixture layer is small, the mixture layer has an unsatisfactory function of reducing thermal stress. While when the thickness of the mixture layer is large, the mixture layer itself has a relatively low level of strength, as compared with the alloy layer and so on, and is thus broken owing to the thermal stress produced by the increase in the thickness of the mixture layer. The thickness of the alloy layer II shown in Table I is not particularly limited, but it is preferably within the range of 0.03 to 0.5 mm. The reason for this is the same as the alloy layer I shown in Table 1.

The mixing ratio between the ceramics and the metal in the mixture layer is not particularly limited. The mixing ratio of the metal to the ceramics in each of the mixture layers shown in Table 1 is 2/1. When the inventors have investigated mixture layers with other mixing ratios, the results obtained with the other mixing ratios were substantially the same as those shown in Table 1. Investigations have also been made on mixture layers in which a mixing ratio was gradually changed from a high ratio of metal to a high ratio of ceramics. The effect was not so clear and was substantially the same as that obtained by the provision of a mixing layer with a uniform mixing ratio.

After each of the test pieces had been subjected to the high temperature oxidation test, it was subjected to a repeated heat load test which was the same as that described above. The temperature of the high temperature oxidation test was 1000° C., and the oxidation time was 500 hours. As a result, the ceramic coating layer of each of the ceramic-coated test pieces of Sample Nos. 5 to B shown in Table 1 was damaged and separated. On the other hand, as a result of repeated heat load tests of the other test pieces, each of the test pieces of Sample Nos. 1 to 4 exhibited a number of the times of heat load tests repeated until damage occurred which was reduced by 20 to 40% and thus exhibited deteriorated durability. While the ceramic-coated test pieces shown in Table 1 within the range of the present invention exhibited substantially the same results as those shown in Table 1. It was also observed that some of the test pieces within the range of the present invention exhibited increased numbers of the times of tests repeated until damage occurred.

Each of the test pieces was then subjected to a high temperature corrosion test using a molten salt coating method. The test was conducted by a method in which a molten salt comprising 25% NaCl and 75% Na2SO4 was coated on each of the test pieces which was then heated at 850° C. for 300 hours in the atmosphere. Each of the test pieces was then subjected to the repeated heat lead test which was the same as that described above. As a result, the ceramic coating of each of the test pieces of Sample Nos. 5 to 8 shown in Table 1 was damaged after the high temperature corrosion test. The results of the repeated heat load tests showed that each of the test pieces of Sample Nos 5 to 8 exhibited a number of the times of tests repeated until damage occurred in the ceramic coating which was reduced by 20 to 0%, and thus exhibited slightly deteriorated durability. While the test pieces shown in Table 1 within the range of the present invention exhibited a number of the times of the tests repeated until damage occurred in the ceramic coatings which were the substantially the same as the results shown in Table 1 and particularly no deterioration in the durability thereof.

Figure 2:
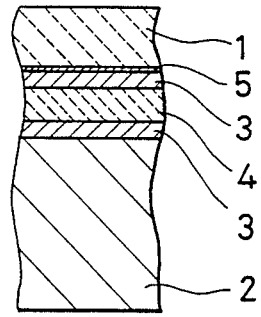
FIGS. 2, 3, 4 are respectively schematic sectional views of other embodiments of the ceramic-coated heat resisting alloy member in accordance with the present invention.
Figure 3:
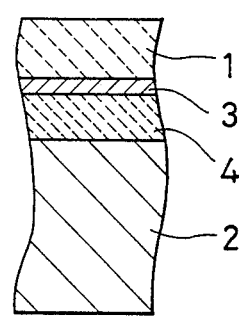
Figure 4:
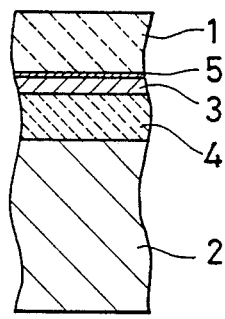

FIGS. 2, 3 and 4 respectively show other embodiments of the present invention. In each of the embodiments, reference numeral 1 denotes a ceramic coating layer; reference numeral 2, a base metal; reference numeral 3, an alloy layer; reference numeral 4, a mixture layer; and a reference numeral 5, an oxide layer mainly composed of Al.

In each of the embodiments shown in FIGS. 2 and 4, the oxide layer mainly composed of Al can be formed by heat treatment of the ceramic coated alloy member. The heat treatment is preferably carried out in the atmosphere under such conditions that the temperature is within the range of 600° to 1200° C. and the time is 1 to 200 hours. The thickness of each oxide layer is preferably 0.1 $\mu$m to 20 $\mu$m. If the oxide layer is thin, the oxide layer exhibits a reduced level of the effect, while if the oxide layer is thick, the oxide layer itself newly produces thermal stress. In each of FIGS. 3 and 4, the embodiment has a structure in which the mixture layer directly contacts with the base metal. In the ceramic coating of the present invention, since the thermal stress reducing function of the mixture layer is stably maintained under the conditions of high temperature oxidation or high temperature corrosion, there is no particular problem even if no alloy layer is interposed between the mixture layer and the base metal.

Although the method of producing the alloy layer in any of the above-described ceramic-coated heat resisting alloy member of the present invention is not particularly limited, it is preferably to use plasma spray coating at a pressure which is reduced to a value below the atmospheric pressure in an atmosphere which comprises a shield gas or an inert gas. The method of producing the mixture layer of ceramics and a metal is the same as that above described. In the case of the alloy layer formed by plasma spray coating in an atmosphere at a reduced pressure, the alloy powder used is not easily oxidized during spray coating, and thus the alloy layer formed is a coating layer having a dense structure in which no contaminants such as oxide coating is mixed. In the mixture layer, the alloy powder comprising the mixture layer is not easily oxidized, and thus the metal portion in the mixture layer is a coating layer having no contaminants such as the oxide coating mixed therein.

In addition, when each of the embodiments of the ceramic-coated heat resisting alloy member of the present invention shown in FIGS. 1 and 3 is used for a long period under conditions of high temperature oxidation, an oxide layer mainly composed of Al is formed at the boundary between the ceramic coating layer and the alloy layer.

As described above, in each of conventional known ceramic-coated members, the mixture layer itself which comprises a mixture of a metal and ceramics is damaged and thus cannot exhibit its primary function of reducing the thermal stress produced between the ceramic coating layer and the base metal under the conditions of high temperature oxidation or high temperature corrosion. The mixture layer rather produces new thermal stress and thus exhibits durability which is inferior to that of a ceramic coating provided with no mixture layer, for example, in a repeated heat load test. While, in the ceramic coating of the present invention, the mixture layer exhibits its function of reducing thermal stress even at high temperature or under high temperature corrosive conditions and is thus effective to improve the durability of the ceramic coating. In addition, when the thickness of the ceramic coating layer is increased, the ceramic-coated heat resisting alloy member formed exhibits no deterioration in its durability, as well as exhibiting a high level of heat barrier effect and high performance.

EXAMPLE 2

Pretreatment of an Ni-based alloy IN-738 which was used as a base metal was performed by the same method as in Example 1, and an alloy layer and a mixture layer were then formed using the materials and the method which were the same as those used in Example 1. The thickness of the alloy layer formed was 0.1 mm and the thickness of the mixture layer was 0.2 mm. The mixing ratios between the ceramics and the metals used in the mixture layers are as shown in Table 2. An alloy powder having the same composition as in Example 1 was then spray-coated on the mixture layers under the same conditions as those employed in Example 1 to form an alloy layer having a thickness of 0.1 mm. A ceramic layer was then formed on the alloy layer using the materials and the method which were the same as those employed in Example 1. The thickness of the ceramic layer was 0.4 mm. Heating treatment was then effected at 1120° C. for 2 hours under vacuum so that the base metal and the alloy layer in contact with the base metal were subjected to diffusion treatment.

TABLE 2

Number of Times of Heat Load Tests Repeated Until Damage Occurs in Ceramic Coating

| Test method | Mixing ratio[4] (M/C) | | | | |
|---|---|---|---|---|---|
| | 4/1 | 2/1 | 1/1 | 1/2 | 1/4 |
| Repeated heat load test[1] | 1170 | 1250 | 1200 | 1270 | 1150 |
| Repeated heat load test after high temperature oxidation test[2] | 1250 | 1170 | 1250 | 1350 | 1100 |
| Repeated heat load test after high temperature corrosion test[3] | 1100 | 1150 | 1150 | 1170 | 1050 |

[1]Repeated heat load test: 1000° C. ⇌ 170° C.
[2]High temperature oxidation test: 1000° C., 500 hours (heating in the atmosphere)
[3]High temperature corrosion test: 850° C., 300 hours (25% NaCl + 75% Na₂SO₄)
[4]M/C: a ratio by volume of the metal to ceramics Each of the thus-formed ceramic-coated heat resisting alloy test pieces was then subjected to the repeated heat load test which was the same as that described above. Table 2 shows the number of the times of heat load tests repeated until the ceramic coating of each of the test pieces was damaged. In the high temperature oxidation tests at 1000° C. for 500 hours, no damage was observed in any ceramic coating after the oxidation tests. When the repeated heat load tests of the test pieces were conducted in the same way as that described above, the numbers obtained of the times of tests repeated until the ceramic coatings were damaged are shown in Table 2. When a molted salt comprising 25% NaCl and 75% Na₂SO₄ was then spray-coated on each of the test pieces which were then subjected to high temperature corrosion tests performed by heating in the atmosphere at 850° C. for 300 hours, no damage was observed in any ceramic coating. When the repeated heat tests using the test pieces which had been subjected to high temperature corrosion tests were conducted in the same manner as that described above, the number obtained of the times of tests repeated until each ceramic coating was damaged are shown in Table 2. On the other hand, a conventional ceramic-coated test pieces formed for the purpose of comparison showed substantially the same results as those exhibited by Samples Nos. 1 to 8 in Table 1. The ceramic coating of the present invention is therefore superior to conventional coating with respect to its resistance to high temperature oxidation and resistance to high temperature corrosion, as well as exhibiting excellent thermal durability.

EXAMPLE 3

Pretreatment of a Ni-based alloy IN738 which was used as a base metal was effected by the same method as that employed in Example 1. An alloy layer and a mixture layer were then formed on the base metal using the materials and the method which were the same as those employed in Example 1. The mixing ratio between the ceramics and the metal in the mixture layer was 1:1. The thickness of the mixing layer was also the same as that in Example 1. An alloy layer having a thickness of 0.02 mm was then formed on the mixture layer by sputtering using as a target an alloy material comprising 32% by weight of Ni, 21% by weight of Cr, 8% by weight of Al, 0.5% by weight of Y and the balance composed of Co. The sputtering was performed under such conditions that the applied voltage was 2 kV and the treatment time was 2 hours. A ceramic coating layer was then formed in the same method as that employed in Example 1. Heat treatment was then effected at 1120° C. for 2 hours so that diffusion treatment was effected. When the thus-formed ceramic-coated heat resisting alloy test piece was subjected to the durability test in the same manner as that in Example 1, the results obtained were substantially the same as those in Example 1.

EXAMPLE 4

A ceramic-coated heat resisting alloy test piece was formed by using the materials and the method which were the same as those employed in Example 1. The thus-formed test piece was then heated in the atmosphere at 950° C. for 20 hours to form an oxide layer mainly composed of $Al_2O_3$ at the boundary between the ceramic coating layer and the alloy layer. As a result of observation of the cross-section texture of the test piece, the thickness of the oxide layer was about 5 μm. As a result of X-ray microanalyzing observation, Al and O were present in a large part of the portion which correspond to the oxide layer, with Cr being present in part of the portion. The thus-formed ceramic-coated heat resisting alloy test piece was then subjected to the durability test which was conducted in the same way as in Example 1. As result, the performance of the test piece was substantially the same as that obtained in Example 1.

EXAMPLE 5

Pretreatment of a Co-based alloy FSX414 used as a base metal was performed by the same method as that employed in Example 1. A ceramic-coated heat resisting alloy test piece was formed by using the same materials those used in Example 1. The method of producing the test piece was a method in which a mixture powder comprising a metal and ceramics in a mixing ratio of 1:1 was spray-coated on a surface of the base metal. The spray coating was effected at pressure of 200 Torr in an atmosphere of Ar. The plasma power was 40 kW. The thickness of the mixture layer was 0.3 mm. An alloy layer was then formed on the mixture layer by spray coating under the same conditions as those employed in the formation of the mixture layer. The thickness of the alloy layer was 0.1 mm. A ceramic coating layer was then formed on the alloy layer by spray coating in the atmosphere with a plasma power of 50 kW. The thickness of the ceramic coating layer was 0.4 mm. The thus-formed ceramic-coated heat resisting alloy test piece of the present invention was then subjected to the durability test which was the same as in Example 1. The results obtained were substantially the same as those obtained in Example 1.

EXAMPLE 6

A ceramic-coated heat resisting alloy test piece was formed by using the materials and the method which were the same as those employed in Example 5. The test piece was then heated in the atmosphere at 1000° C. for 15 hours to form an oxide layer mainly composed of $Al_2O_3$ at the boundary between the ceramic coating layer and the alloy layer. As a result of observation of the cross-sectional texture of the test piece, the thickness of the oxide layer was about 7 μm. The result of X-ray microanalyzing observation showed that Al and O are present in a large area of the oxide layer, with Cr being present in part of the oxide layer. When the thus-formed ceramic-coated heat resisting alloy test piece of the present invention was then subjected to the durability test which was the same as that employed in Example 1, substantially the same results were obtained.

As described above, the present invention is capable of preventing the progress of high temperature oxidation or high temperature corrosion of the mixture layer comprising a metal and ceramics. The function of reducing thermal stress which is the principal purpose of the provision of the mixture layer can thus be stably maintained, as well as the reliability of the ceramic-coated heat resisting alloy member formed being improved.

What is claimed is:

1. A ceramic-coated heat resisting alloy member comprising:
   a heat resisting alloy base metal comprised of at least one of nickel, cobalt and iron;
   a mixture layer comprising a ceramic material and a metal and deposited on the external surface of said base metal;
   an alloy layer which comprises an alloy material which is superior to said base metal with respect to its resistance to high temperature oxidation and resistance to high temperature corrosion and which has been deposited on a surface of said mixture layer; and
   a ceramic coating layer deposited on a surface of said alloy layer; said ceramic coating layer comprising $ZrO_2$ as a main component and at least one of CaO, $Y_2O_3$ and MgO and said ceramic material of said mixture layer comprising $ZrO_2$ as a main component and at least one of CaO, $Y_2O_3$ and MgO.

2. A heat resisting alloy member according to claim 1, wherein the material forming said alloy layer is comprised of at least one of cobalt and nickel as a main component, chromium and aluminum and at least one of hafnium, tantalum, yttrium, silicon and zirconium.

3. A heat resisting alloy member according to claim 1, wherein said mixture layer comprises a mixture material containing said ceramic material and an alloy material comprised of at least one of cobalt and nickel, chromium and aluminum and at least one of hafnium, tantalum, yttrium, silicon and zirconium.

4. A heat resisting alloy member according to claim 1, wherein the thickness of said ceramic coating layer is 0.05 to 1.0 mm.

5. A heat resisting alloy member according to claim 4, wherein the thickness of said alloy layer is 0.03 to 0.5 mm.

6. A heat resisting alloy member according to claim 5, wherein the thickness of said mixture layer is 0.03 to 0.5 mm.

7. A ceramic-coated heat resisting alloy member comprising:
   a heat resisting alloy base metal mainly comprised of at least one of nickel, cobalt and iron;
   a second alloy layer which comprises an alloy material superior to said base metal with respect to its resistance to high temperature oxidation and resistance to high temperature corrosion and which has been deposited on an external surface of said base metal;
   a mixture layer which comprises a ceramic material and a metal and which has been deposited on a surface of said second alloy layer;
   a first alloy layer which comprises an alloy material superior to said base metal with respect to its resistance to high temperature oxidation and resistance to high temperature corrosion and which has been deposited on a surface of said mixture layer; and
   a ceramic coating layer deposited on a surface of said first alloy layer; said ceramic coating layer comprising $ZrO_2$ as a main component and at least one of CaO, $Y_2O_3$ and MgO and said ceramic material of said mixture layer comprising $ZrO_2$ as a main component and at least one of CaO, $Y_2O_3$ and MgO.

8. A heat resisting alloy member according to claim 7, wherein the material forming said first and second alloy layers comprises at least one of cobalt and nickel as a main component, chromium and aluminum and at least one of hafnium, tantalum, yttrium, silicon and zirconium.

9. A heat resisting alloy member according to claim 7, wherein said mixture layer comprises a mixture material containing said ceramic material and an alloy material comprised of at least one of cobalt and nickel, chromium and aluminum and at least one of hafnium, tantalum, yttrium, silicon and zirconium.

10. A heat resisting alloy member according to claim 7, wherein the thickness of said ceramic coating layer is 0.05 to 1.0 mm.

11. A heat resisting alloy member according to claim 10, wherein the thickness of said first and second alloy layers is 0.03 to 0.5 mm, respectively.

12. A heat resisting alloy member according to claim 11, wherein the thickness of said mixture layer is 0.03 to 0.5 mm.

13. A ceramic-coated heat resisting alloy member comprising:
   a heat resisting alloy base metal;
   a second alloy layer which comprises an alloy material superior to said base metal with respect to its resistance to high temperature oxidation and which has been deposited on an external surface of said base metal by a spray coating method; a mixture layer which comprises a ceramic material and a metal in a ratio by weight of 2:1 and which has been deposited on a surface of said second alloy layer by a spray coating method;
   a first alloy layer which comprises said alloy material deposited on a surface of said mixture layer by a spray coating method; and
   a ceramic coating layer which is a ceramic material deposited on a surface of said first alloy layer by a spray coating method; wherein
   said heat resisting alloy base metal comprises at least one of Ni and Co as a main component, 7 to 20 wt % of Cr and 1 to 8 wt % of at least one of Ti and Al, and at least one of Ta, Nb, W and Mo in a total content of 10 wt % or less;
   said alloy material comprises at least one of Ni and Co, 13 to 40 wt % of Cr, 5 to 20 wt % of Al, and 0.1 to 3 wt % of at least one of Hf, Ta, Y, Si and Zr;
   said ceramic material comprises $ZrO_2$ as a main component, and at least one of 4 to 20 wt % of $Y_2O_3$, 4 to 8 wt % of CaO and 4 to 24 wt % of MgO;
   the thickness of said second alloy layer is 0.03 to 0.5 mm;
   the thickness of said mixture layer is 0.03 to 0.5 mm;
   the thickness of said first alloy layer is 0.03 to 0.5 mm;
   the thickness of said ceramic coating layer is 0.05 to 1.0 mm; and
   said spray coating method is a plasma spray coating method.

* * * * *